United States Patent [19]

Yashiro et al.

[11] Patent Number: 5,064,250
[45] Date of Patent: Nov. 12, 1991

[54] WHEEL FOR LIGHT VEHICLE AND DISC USED THEREFOR

[75] Inventors: Tadashi Yashiro, Nara; Takafumi Nishimoto, Ichihara, both of Japan

[73] Assignees: Sugino Cycle Industries, Ltd., Nara; Nippon Steel Chemical Co., Ltd., Tokyo, both of Japan

[21] Appl. No.: 365,649

[22] Filed: Jun. 13, 1989

[30] Foreign Application Priority Data

| Jun. 17, 1988 | [JP] | Japan | 63-150468 |
| Jul. 20, 1988 | [JP] | Japan | 63-095932[U] |
| Sep. 1, 1988 | [JP] | Japan | 63-115246[U] |
| Sep. 22, 1988 | [JP] | Japan | 63-124612[U] |
| Dec. 8, 1988 | [JP] | Japan | 63-159922[U] |
| Dec. 8, 1988 | [JP] | Japan | 63-310509 |
| Dec. 28, 1988 | [JP] | Japan | 63-171076[U] |
| Feb. 15, 1989 | [JP] | Japan | 1-017031[U] |
| Feb. 15, 1989 | [JP] | Japan | 1-037146 |

[51] Int. Cl.$^5$ .............................................. B60B 3/00
[52] U.S. Cl. ........................ 301/63 DS; 301/63 PW; 301/55
[58] Field of Search ............... 301/54, 55, 58, 59, 301/63 DD, 63 PW, 63 DS, 56

[56] References Cited

U.S. PATENT DOCUMENTS

| 466,598 | 1/1892 | Bunker | 301/55 X |
| 1,005,103 | 10/1911 | Chessnut | 301/54 |
| 1,113,577 | 10/1914 | Redfield | 301/55 |
| 1,303,501 | 5/1919 | Rouanet | 301/54 |
| 1,938,862 | 12/1933 | Roe | 301/97 |
| 3,158,404 | 11/1964 | Noakes | 301/63 DD X |
| 3,462,817 | 8/1969 | Horsfall et al. | 301/63 R X |
| 4,114,953 | 9/1978 | Baumgartner | 301/63 PW X |
| 4,602,823 | 7/1986 | Berg | 301/55 X |
| 4,844,552 | 7/1989 | Tsygankou et al. | 301/63 PW X |
| 4,858,297 | 8/1989 | de Longcamp | 301/55 X |

FOREIGN PATENT DOCUMENTS

| 83 685/82 | 11/1982 | Australia . |  |
| 8806988 | 8/1988 | Fed. Rep. of Germany . |  |
| 909095 | 4/1946 | France . |  |
| 594494 | 6/1959 | Italy | 301/58 |
| 61-160301 | 7/1986 | Japan . |  |
| 105964 | 5/1917 | United Kingdom . |  |
| 2180510A | 4/1987 | United Kingdom . |  |

Primary Examiner—Russell D. Stormer
Attorney, Agent, or Firm—Armstrong, Nikaido, Marmelstein, Kubovcik & Murray

[57] ABSTRACT

A wheel for light vehicles and a disc member used therein. The wheel comprising a hub, a rim and a pair of disc members detachably coupled with the hub and the rim, wherein the wheel has the advantage of a spoke wheel that it is lightweight and has sufficient strength as well as the advantage of a disc wheel that it has less air resistance when it rotates, and further the wheel can be easily repaired when it is damaged.

8 Claims, 11 Drawing Sheets

WHEEL FOR LIGHT VEHICLE AND DISC USED THEREFOR

FIELD OF THE INVENTION AND RELATED ART STATEMENT

The present invention relates to wheels used in various light vehicles such as bicycles, motor bicycles and the like, and further to a disc member for coupling a hub with a rim of the wheel.

The wheels used in light vehicles such as bicycles and motor bicycles include a spoke wheel wherein a multiplicity of spokes are radially stretched between a hub of a rotational shaft and a rim as a circumferential member. With this conventional spoke wheel, since a load applied to the hub or the rim is dispersed to radially disposed spokes as tension, the load is not concentrated on one point on the wheel, and thus the wheel has a high resistance to shock. Thus, a wall thickness of the rim can be reduced to some degree and the wheel employing this kind of the rim has been widely used as a wheel having sufficient strength for practical use.

This conventional spoke wheel, however, has some drawbacks.

First, the wheel has not sufficient strength against a load given by a shock given in a radial direction. This is because that the rim which tends to deform to an oval shape by the shock load from a road is supported only by a group of spokes stretched in a direction perpendicular to a direction in which the shock load is exerted and the exerted shock does not disperse to the respective spokes as substantially uniform tension. Therefore, the rigidity of the rim must be increased by increasing the cross sectional area or the thickness of the rim to improve a resistance to shock. Accordingly, the weight of the spoke wheel is reduced near to its possible limit.

Second, since a high drag force of air flow exerted on the spokes when the wheel rotates, all the energy transmitted to a rotational shaft is not always transmitted to the road, which is particularly an important problem to racing bicycles and the like which emulate in speed.

Recently, to solve the latter air flow drag force problem of the problems encountered by the spoke wheel, a so-called disc wheel has been used which is substantially formed to a disc shape.

Figure 22:
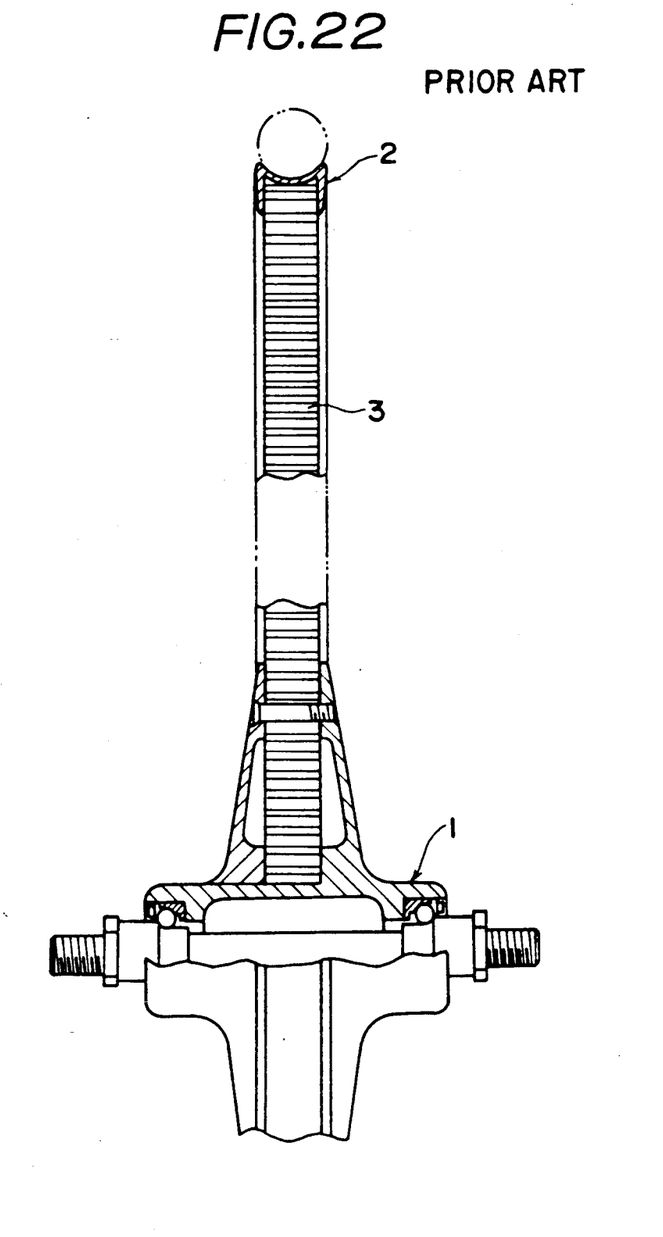
FIG. 22 is a cross sectional view of a conventional disc wheel.

As shown in FIG. 22, this conventional disk wheel comprises a disc member interposed between a hub 1 and a rim 2 and the hub 1 and the rib 2 are integrally shaped to a flat circular plate by the disk member 3, wherein the strength and rigidity of the wheel is provided by a principle completely different from that of the above spoke wheel. More specifically, the strength and the rigidity of the spoke wheel is provided by the tensile strength of the spokes disposed radially, whereas the strength and rigidity of the disc wheel directly depends on the strength and rigidity of the disc member 3 interposed between the hub 1 and the rim 2.

As a result, in order to increase the strength and rigidity of the wheel, the strength and rigidity of the disc member must be increased and the rim and the hub must be integrally formed with the disc member to provide a single flat circular plate which is not deformed by an external force.

Taking the above into consideration, the conventional disc wheel comprises the hub 1 and the rim 2 directly formed at the center and around teh outer circumferential edge of the disc member 3 employing a honeycomb structure to provide strength and rigidity, or the disc member 3 composed of a special material and integrally formed with the rim 2 and the hub 1 by bonding.

The increase in the strength and rigidity of the disc member, however, is inevitably accompanied by the complexity of the structure thereof and the increase in the thickness of a material constructing the disc member, and then the disc member has a problem that it is as strong as the spoke wheel at the sacrifice of the weight thereof.

Further, as described above, since the hub 1, the rim 2 and the disc member 3 are integrally formed, if a part of the rim 2 is damaged, for example, the replacement of the rim 2 only is almost impossible, and even if it is possible, the replacement is more troublesome than the repair of the spoke wheel.

Therefore, the conventional disc wheel also has a drawback that when a part of it is damaged, it is difficult to repair only this part but the overall wheel must be replaced.

As described above, the conventional wheels for the light vehicles have advantages and disadvantages with rsepect to strength, weight and air resistance, and then they must be selectively used depending on the applications thereof.

OBJECT AND SUMMARY OF THE INVENTION

An object of the present invention is to provide a wheel for ligth vehicles having both the advantage of a spoke wheel that the wheel is lightweight and has sufficient strength for practical use and the advantage of a disc wheel that it has a small resistance to air while it rotates and is capable of being easily repaired when damaged.

Another object of the present invention is to provide a disc member used to assemble a wheel for light vehicles having both the advantages of the spoke and disc wheel sand capable of being easily repaired.

A further object of the present invention is to provide a disc member capable of being assembled to a commercially available hub and rim.

More specifically, the wheel for the light vehicles according to the present invention comprises a hub provided with a rotating shaft, a rim having mounting holes passing therethrough in radial directions and a pair of disc members composed of a single or a plurality of sheet or plate members and stretched between the hub and the rim to couple them, the disc member having an opening adaptable to the hub at the center thereof, an inner circumferential edge detachably coupled with the hub and an outer circumferential edge detachably coupled with the rim.

In this invention, since the disc member is stretched between the hub and the rim, a load imposed on the hub and the rim is exerted on the disc member as tension. Therefore, the disc member may be composed of any sheet or plate member as long as it has sufficient tensile strength. A material of the member may be selected from a thin metal plate, a synthetic resin such as a polyethylene terephthalate resin, a nylon resin, a polypropylene resin, a polyimide resin, a fluorine resin and the like or a composite material of a fiber material such as a polyaramide fiber, a carbon fiber, a glass fiber and the like and a synthetic resin.

In order to increase a resistance to shock of the wheel and to make it lightweight, the disc member is preferably provided with a plurality of reinforcing members disposed like the spokes of the conventional spoke wheel and a plurality of reinforcing members connecting the coupled portions of the disc member and the rim in coincidence with the directions of the arcs of the rim. With this arrangement, tensile strength against the directions in which strong tensile is exerted can be increased, the strong tensile being caused by the transmission of rotational torque from the hub to the rim, the action of a shock load from a road and the like. Since the wheel having the disc member stretched therein has an improved resistance to shock, the strength of the rim can be reduced accordingly to reduce the weight of the overall wheel. The reinforcing members can be formed to the disc member by various methods depending on the material of the disc member. For example, when the disc member is composed of a thin metal plate, it can be provided with a rising portion having a V-shaped cross section by stamping. Further, when the disc member is composed of a synthetic resin, a strand of a fiber material is accommodated in the synthetic resin sheets to provide reinforcing members.

In addition, the disc member may be coupled with the hub by any coupling means as long as the means enables the disc member to be detachably coupled with the hub. For example, the disc member may be coupled with the hub through the inner circumferential edge of an opening defined at the center thereof fixed to the hub by screws or may be pressed into contact with the hub using a component force produced when the disc member is stretched. When, however, the center in a rim width direction is displaced from the center in a hub axial direction in such a case as a rear wheel for a bicycle and the like, a pair of right and left disc members cannot be uniformly stretched, and thus a special hub must be prepared to directly couple the hub with the disc member. Therefore, in order to fabricate the wheel according to the present invention at a low cost using a commercial available usual hub, an auxiliary plate is preferably provided with the inner circumferential edge of one of the disc members to correct this displacement, whereby the disc member is coupled with the hub through this auxiliary plate.

Further, the disc member may be coupled with the rim by any coupling means as long as the means enables the disc member to be detachably coupled with the rim by the means. For example, the structure of coupling spokes with a rim used in a spoke wheel may be applicable to the coupling thereof as it is. More specifically, in this case, a nipple composed of a locking member to be engaged with the outer circumferential edge of the disc member and a screw member to be inserted into the mounting hole provided with the rim is used, and tension is applied to the disc member by tightening the nipple. With this method, the wheel of the present invention can be fabricated using a usual rim without the need for a special rim, wherein, a reinforcing annular member composed of a fiber material or a metal wire is preferably provided with the outer circumferential edge of the disk member to enable the locking member of the nipple to be engaged with this reinforcing annular member to apply tension to the disc member, whereby the tension exerted to the disc member from is prevented from concentrating on the portion where the disc member is engaged with the locking member. Further, it is preferable that the locking member is not fixed to the disc member but movably engaged with the reinforcing annular member even if the mounting hole of the rim is slightly displaced from the locking member mounted on the disc member, in order to enable the overall disc member to be uniformly stretched.

With this arrangement, one of a pair of the disc members disposed on the opposite sides of the hub and the rim functions like a group of the spokes disposed on one side of the spoke wheel. Therefore, the wheel for the light vehicles according to the present invention is provided with strength and rigidity as a wheel by the same principle as that of the conventional spoke wheel.

According to the present invention, however, since the flat and circular disc member is stretched, the arrangement of this disc member is similar to the arrangement of the conventional spoke wheel including additional spokes disposed in arc directions of the rim. Therefore, this wheel has a higher resistance to shock than the conventional spoke wheel, and then the strength and rigidity of the rim may be reduced accordingly to reduce the wheel weight.

Further, since a load applied to the wheel is dispersed over the entire surface of the disc member as tension, the tension exerted on a unit cross sectional area of the disc member is smaller than that of the spokes of the spoke wheel so that the weight of the disc members can be made lighter than the overall weight of the spokes of the spoke wheel.

In addition, as described above, the disc member can be composed of a synthetic resin sheet or a composite material of a fiber material and a synthetic resin, whereby the disc member can be made more lighter by using this light material having high tensile strength.

With this arrangement of the present invention, the wheel having a resistance to shock equal to or higher than that of the spoke wheel can be provided by stretching the disc members between the hub and the rim, whereby not only the structure member (disc member) interposed between the hub and the rim is made lighter than the conventional disc wheel but also it can be made lighter than the spoke wheel.

In addition, since a pair of the disc members stretched between the hub and the rim entirely cover the opposite sides of the wheel, an air resistance caused when the wheel rotates can be reduced like the disc wheel.

Further, since the disc member, the hub and the rim are detachably coupled, respectively, when a part of them is damaged, only the damaged part can be replaced.

Further, when the wheel is fabricated, a pair of the disc members are assembled between the hub and the rim, and thus it takes less labor than the spoke wheel in fabrication and its parts can be managed more easily. In addition, the fabrication thereof can be easily automated.

DETAILED DESCRIPTION OF THE PREFERRED EMBODIMENTS

A wheel for light vehicles and a disc member used therefor according to the present invention will be described below in detail with reference to the accompanying drawings.

FIG. 1 through FIG. 5 show a first embodiment according to the present invention. The wheel for the light vehicles in the first embodiment comprises a hub 1 provided with a pair of flanges 11 for fixing disc members 3, a rim 2 including mounting holes 21 defined at prescribed pitches and passing therethrough in a radial direction and a pair of disc members 3 stretched between the hub 1 and the rim 2.

In this embodiment, the disc member 3 is composed of a circular-shaped thin metal sheet having a diameter substantially as large as the inside diameter of the rim 2. The disc member 3 has an opening 31 defined at the center thereof to enable a rotational shaft 12 of the hub 1 to pass therethrough and through holes 32 defined around the inner circumferential edge thereof and corresponding to screw holes 13 defined to the flanges 11 at prescribed pitches. Thus, as shown in FIG. 1, after a screw 48 is inserted into each through hole 32 from the outside of the disc member 3, it is threadedly engaged with a screw hole 13 of the flange 11 so that the inner circumferential edge of the disc member 3 is fixed to the flange 11.

Figure 1:
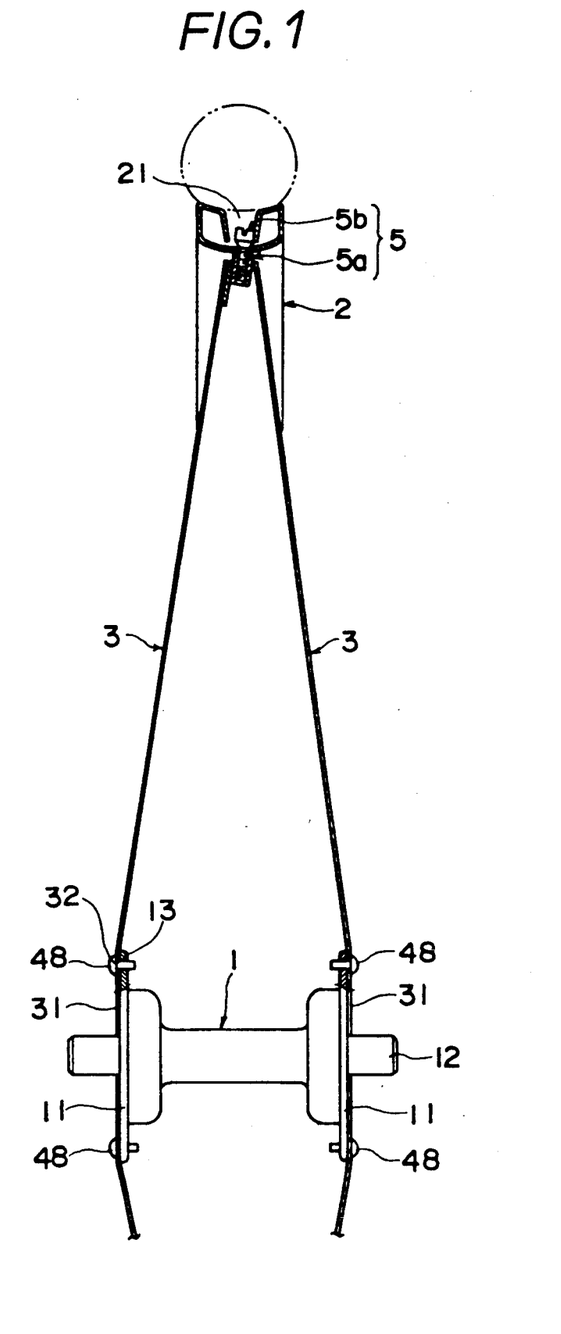
FIG. 1 is a partial cross sectional view of a wheel for light vehicles of a first embodiment according to the present invention.
Figure 2:
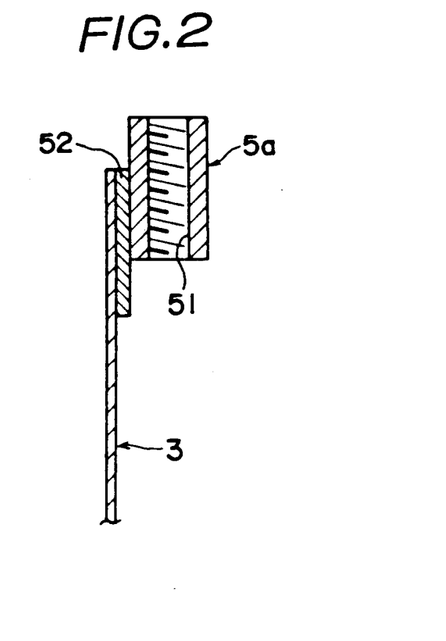
FIGS. 2 and 3 are a cross sectional view and a side elevational view illustrative of a circumferential edge portion of a disc member.
Figure 3:
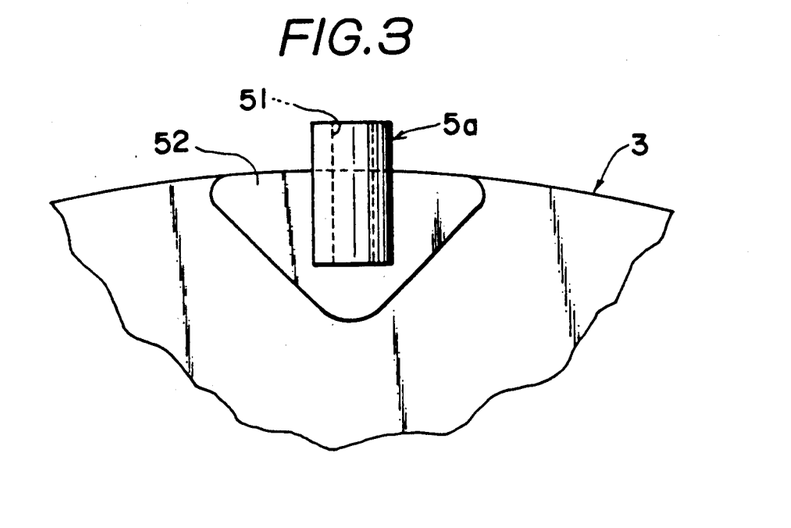

Further, as shown in FIG. 1, the outer circumferential edge of the disc member 3 is fixed to the rim by a nipple 5 composed of a cylindrical locking member 5a with a female screw 51 defined therethrough and a screw member 5b threadedly engaged with the locking member 5a. As shown in FIGS. 2 and 3, the locking member 5a is welded to a substantially triangular metal plate 52 with its one end projected, and then the metal plate 52 is fixed to the inner surface side of the disc member 3 by spot welding. Note that the locking members 5a are disposed to the disc member 3 at pitches twice those of the mounting holes 21 defined to the rim 2.

Conversely, the rim 2 to which the outer circumferential edge of the disc member 3 is fixed is a usual rim having thirty two mounting holes 21, and, as shown in FIG. 1, has an opening diameter on the side of the inner circumference thereof which is smaller than that of an opening diameter on the side of the outer circumference. The screw member 5b having a male thread defined thereto (see FIG. 5) is inserted into the mounting hole 21. This screw member 5b is composed of a head portion 54 having a hexagonal hole 53 defined therein and the male screw 55 projecting from the head portion 54, and when the screw member 5b is inserted into the mounting hole 21, the head portion 54 is locked at the opening on the inner circumference side of the rim 2.

Therefore, as shown in FIG. 1, the threading engagement of the screw member 5b passing through the mounting hole 21 with the locking member 5a provided with the disc member 3 enables the outer circumferential edge of the disc member 3 to be fixed to the rim 2. In addition, the increase in a threading amount of the screw member 5b into the locking member 5a causes the locking member 5a to be pulled toward the rim 2 side to stretch the disc member 3.

Figure 4:
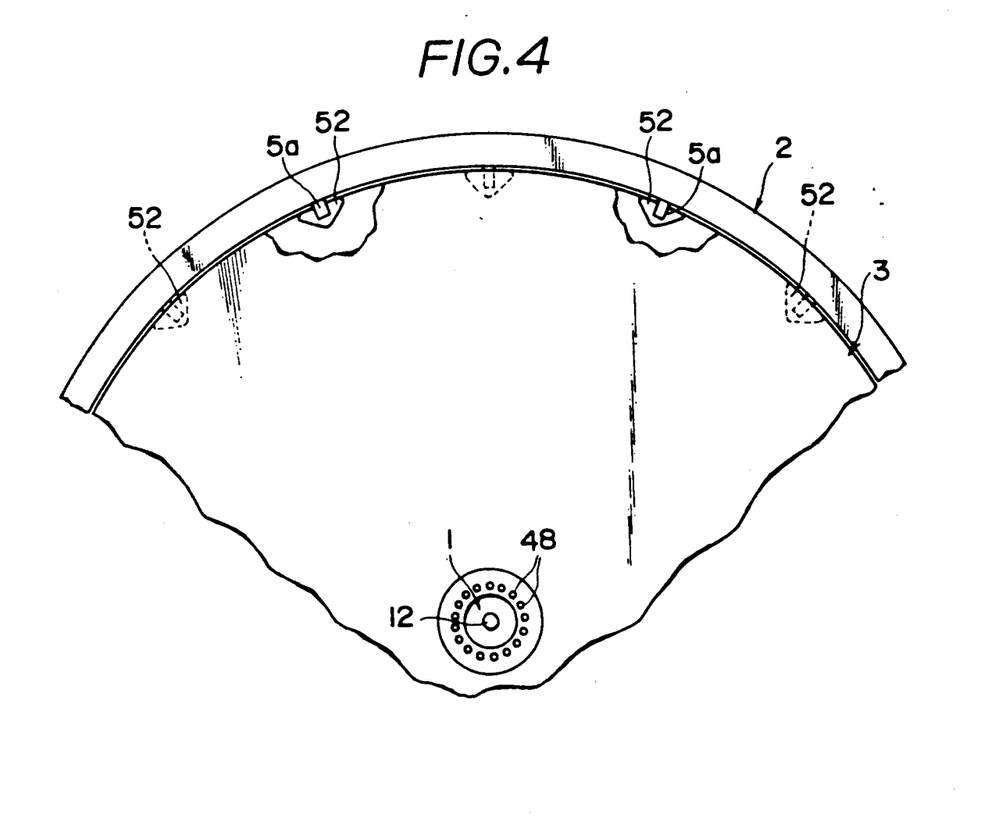
FIG. 4 is a partial side elevational view of a first embodiment.

With the wheel for the light vehicles of this embodiment arranged as above, the wheel having the opposite sides thereof covered with the disc members 3 is completed in such a manner that each inner circumferential edge of a pair of the disc members 3 is fixed to the flange 11 of the hub 1, and then, as shown in FIG. 4, the locking members 5a provided with one of the disc member 3 and the locking members 5a provided with the other of the disc member 3 are alternately fixed to a series of the mounting holes 21.

Figure 5:
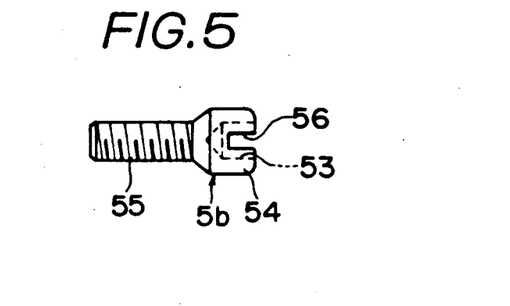
FIG. 5 is a side elevational view illustrative of a male screw nipple.

In this wheel, the balance of tension exerted on the disc members 3 can be adjusted by adjusting a threading amount of the screw members 5b threadedly engaged with the locking members 5a so that the balance of the wheel can be adjusted in the same procedure as that of the conventional spoke wheel. Although an Allen wrench suitable to the hexagonal hole 53 is used to thread the screw member 5b, a minus driver may be used when a groove portion 56 is defined, as shown in FIG. 5.

Next, a second embodiment shown in FIG. 6 through FIG. 16 will be described.

Figure 6:
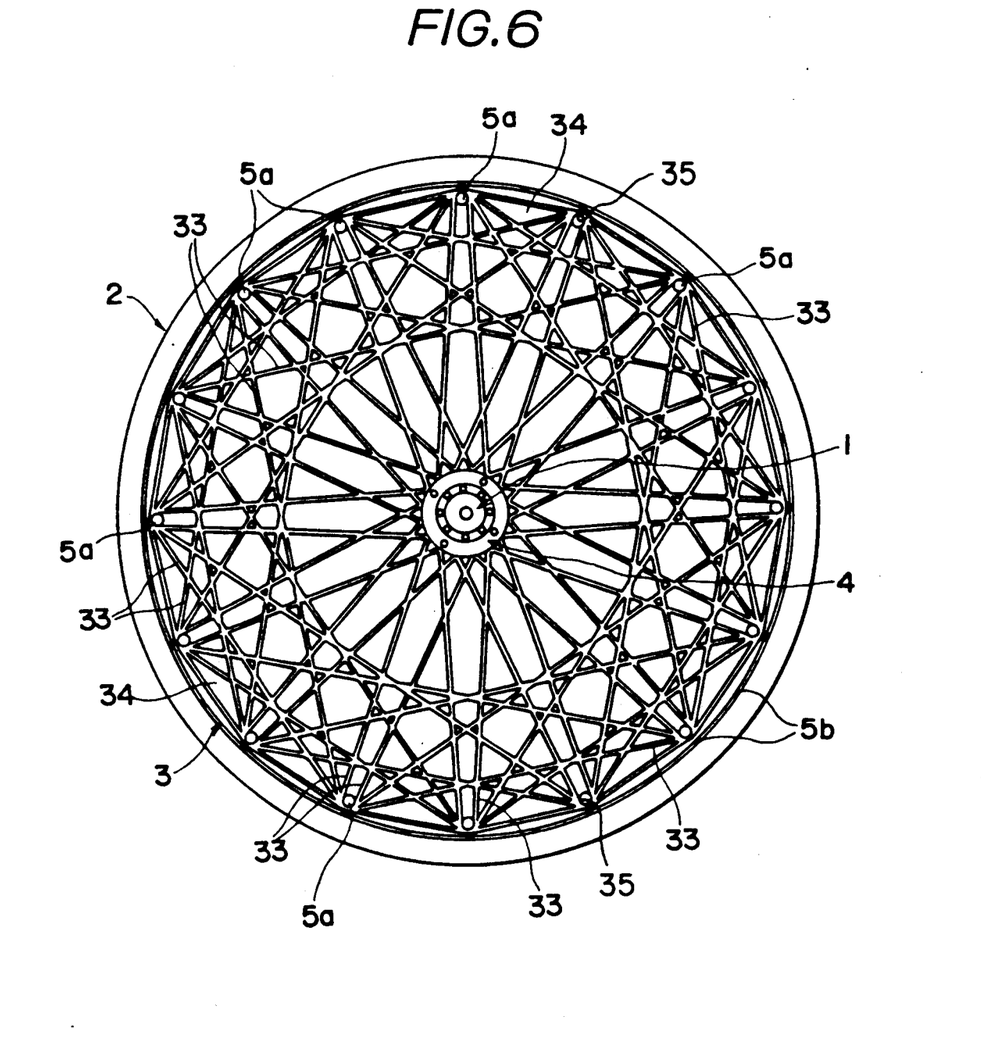
FIG. 6 is a side elevational view of a wheel of a second embodiment according to the present invention.

In this embodiment, a disc member 3 has a main portion thereof composed of synthetic resin sheets 34 and accommodates a reinforcing strand 33 made of a bundled fiber material. The disc member 3 has an opening 31 similar to that of the first embodiment defined at the center thereof and fixed to a hub through an auxiliary ring 4, whereas the disc member has the outer circumferential edge thereof provided with sixteen through holes 35 defined at the same intervals and fixed to the rim 2 by nipples 8 comprised of a member 8a engaged with the through holes 35 and a screw member 8b. As shown in FIG. 6, the reinforcing strand 33 is stretched in the synthetic resin sheets in such a manner that it coincides with the tangential direction of each through hole 35 and the opening 38 and the tangential direction between respective through holes 35 with a result that it can absorb almost all the tension exerted on the disc member 3.

Figures 7, 8:
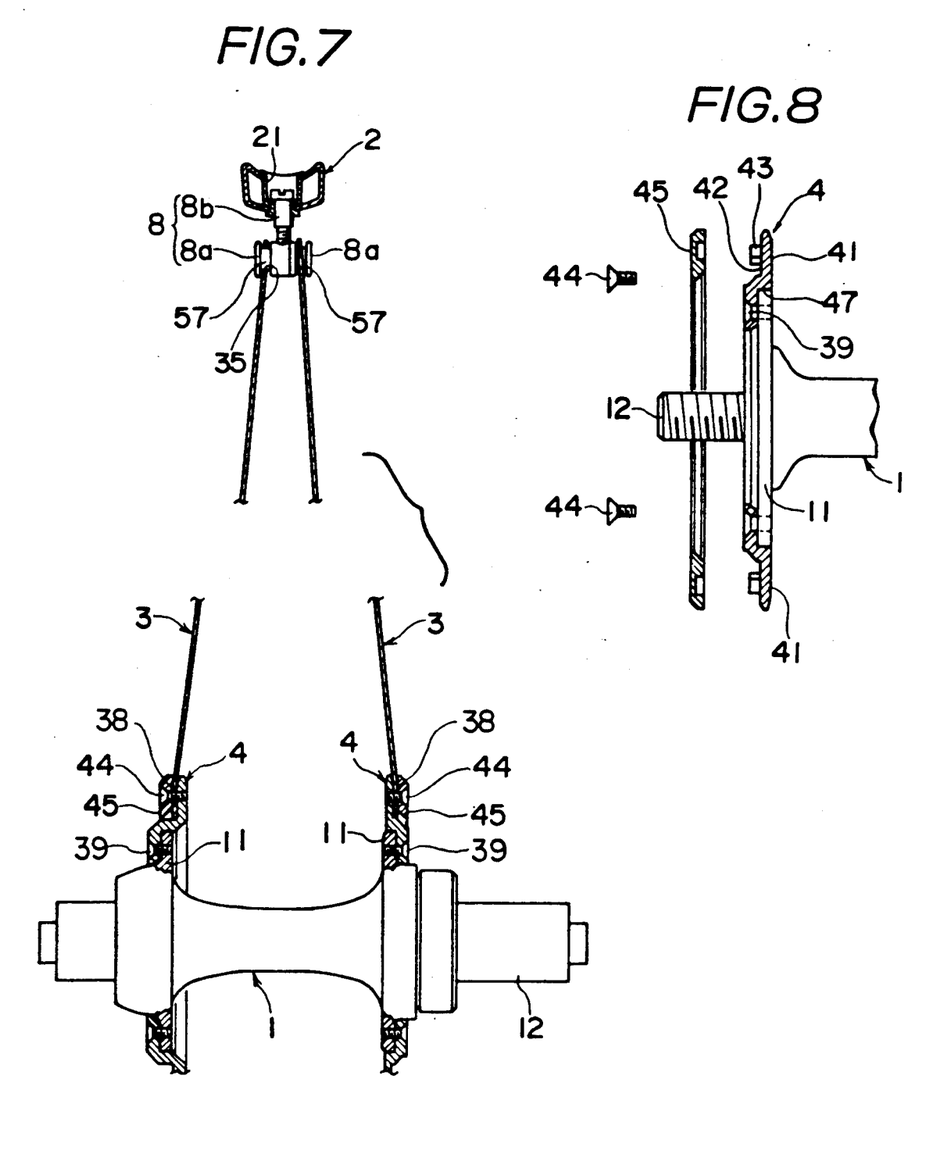
FIG. 7 is a cross sectional view of the wheel of the second embodiment.
FIGS. 8 and 9 are a cross sectional view and a side elevational view illustrative of the state of a hub coupled with an auxiliary ring.
Figure 9:
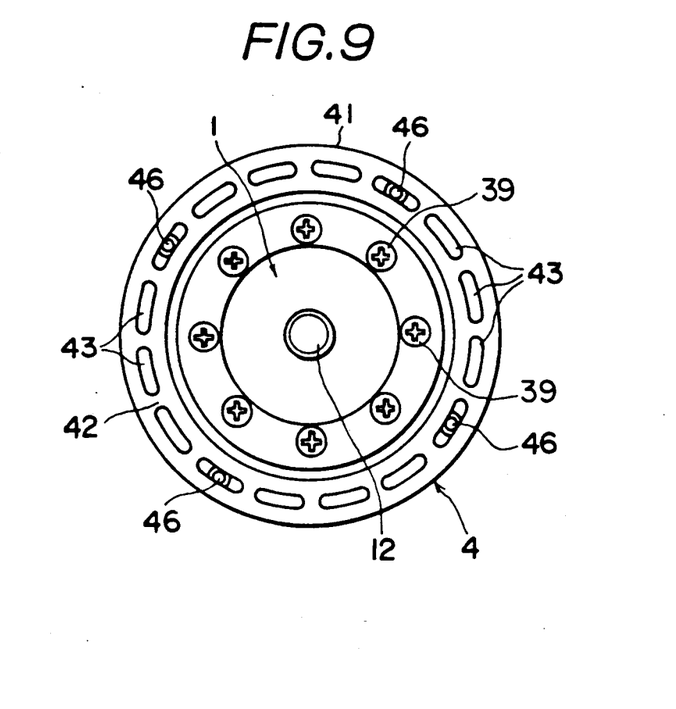

As shown in FIGS. 8 and 9, the auxiliary ring 4 has the outer circumferential edge thereof provided with a collar member 41 having one side serving as an annular surface 42 for fixing the inner circumferential edge of the disc member 3. The annular surface 42 is provided with sixteen projections 43 for locking the reinforcing strand 33. The inner circumferential edge of the disc member 3 is fixed to the auxiliary ring 4 by a pressing plate 45 mounted to the collar member 41 by screws. Designated at numeral 46 are screw holes with which screws 44 are threadedly engaged to fix the pressing plate 45. The auxiliary ring 4 has the inner circumferential edge thereof provided with a recessed portion 47 to be engaged with a flange 11. The flange 11 is fixed in the recessed portion 47 by screws 39 to enable the outer surface of the flange 11 and the annular surface 42 to be located on the same surface, whereby the same tension as that of the case wherein the disc member 3 is directly fixed to the flange 11 is exerted on the disc member 3. The auxiliary rings 4 of the same type are usually coupled with a pair of the disc members 3. When, however, the center of the hub 1 in its axial direction must be displaced with respect to the center of the rim 2 in its width direction in such a case as a bicycle rear wheel, the auxiliary rings 4 cannot be used as the pair. As shown in FIG. 7, in this case, the recessed portion 47 with which the flange 11 is engaged is defined deeper, and one of the auxiliary rings 4 is used such that when the hub 1 is fixed, the annular surface 42 is located inwardly of the outer surface of the flange 11.

Further, the nipple 8 shown in FIG. 7 is used to fix the disc member 3 to the rim 2. This nipple 8 is composed of a cylindrical locking member 8a provided with a locking groove 57 to be engaged with the through hole 35 of the disc member 3 and and a screw member 8b to be threadedly engaged with this locking member 8b. The locking member 8b is engaged with the through hole 35, whereas the screw member 8b is inserted into the mounting hole 21 of the rim 2 and the screw member 8b is threaded into the locking member 8a, whereby the outer circumferential edge of the disc member 3 is pulled toward the rim 2 side to exert tension to the disc member 3. In addition, this arrangement wherein the locking member is engaged with the through hole of the disc member enables the disc to be uniformily stretched even if the mounting hole of the rim is slightly dislocated from the through hole.

Note that the rim 2 used in the wheel of this embodiment is a usual rim having the htiry two mounting holes 21 and the number of the nipples 8 engaged with one of the disc members 3 and the number of the projections of the auxiliary ring 4 are half of the number of these mounting holes.

Next, a method of fabricating the disc member 3 used in this embodiment will be described.

Figure 11:
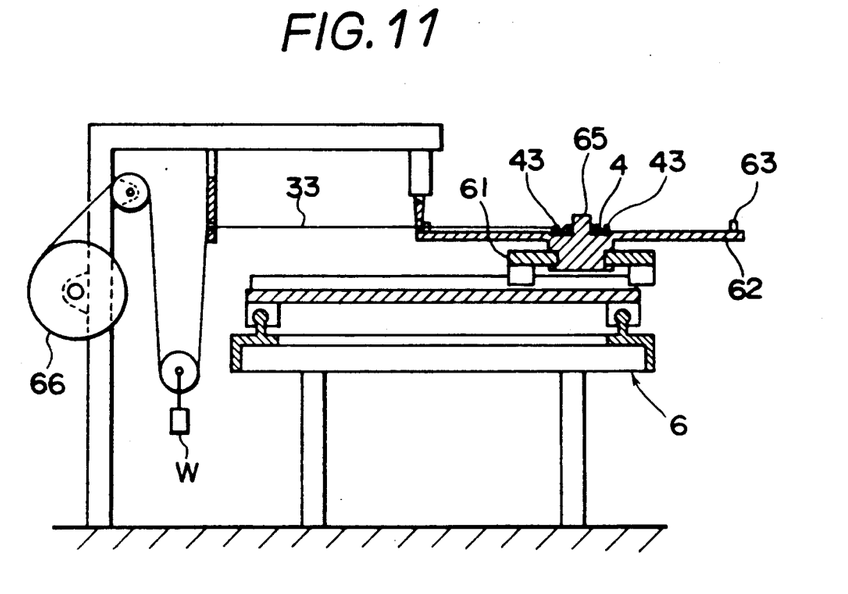
FIGS. 11 and 12 are a front view and a plan view schematically illustrative of a jig for stretching a reinforcing string.
Figure 12:
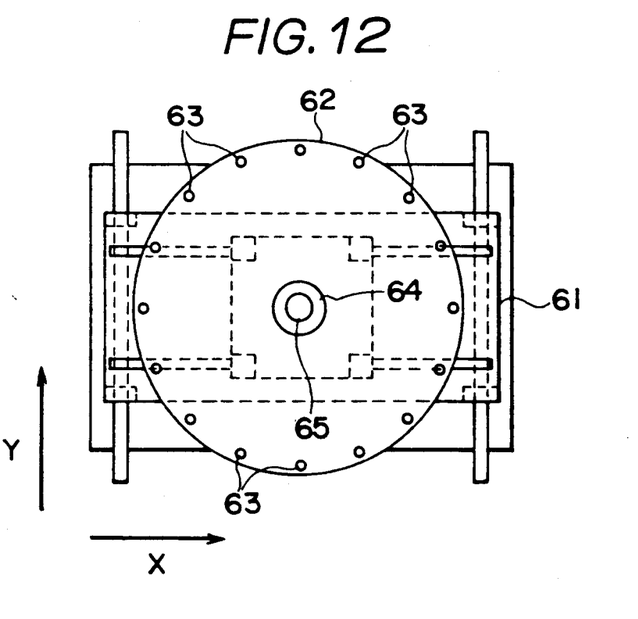
Figure 13:
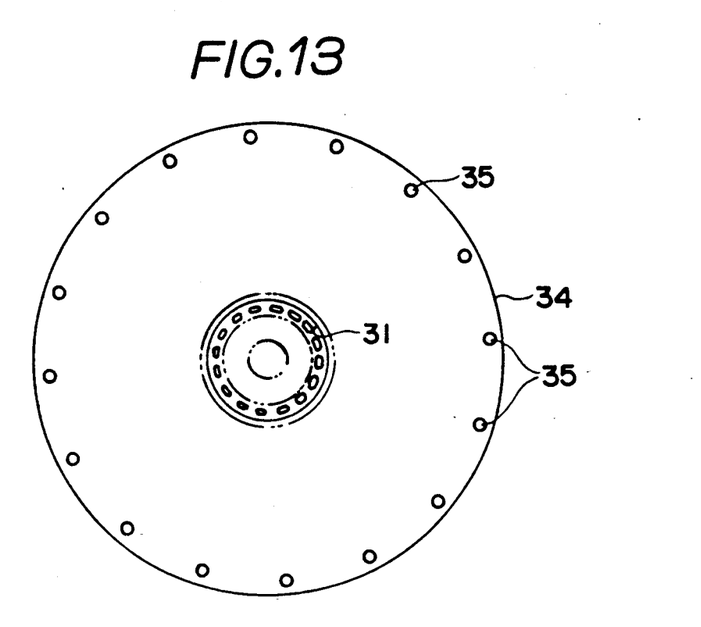
FIG. 13 is a plan view illustrative of a synthetic resin sheet used for a disc member of the second embodiment.
Figure 14:
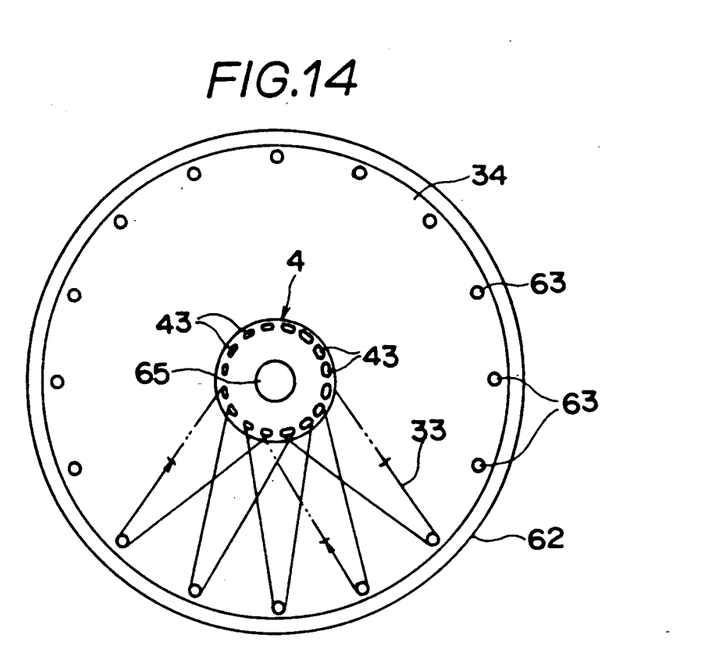
FIG. 14 through FIG. 16 are diagrams showing a procedure for stretching a reinforcing string.

When the disc member 3 is fabricated, a specially arranged jig 6 is used to stretch the reinforcing strand 33, as shown in FIGS. 11 and 12. This jig 6 is composed of a disc-shaped stretching table 62 rotatingly disposed on an XY table 61 movable in two directions along X and Y axes on a plane. The stretching table 62 has the outer circumferetial edge provided with pins 63 corresponding to the respective through holes 35 of the disc members 3 and an annular recessed portion 64 and a holding shaft 65 disposed at the center thereof to mount and fix the auxiliary ring 4. The engagement of the auxiliary ring 4 with the holding shaft 65 enables the annular surface 42 of the auxiliary ring 4 to coincide with the surface of the stretching table 62.

In a practical fabrication, first, the auxiliary ring 4 is set on the stretching table 62 after it is engaged with the holding shaft 65 in such a manner that the projections 43 are directed upward, and next the synthetic resin sheet 34 is placed on the stretching table 62 such that the opening 38 at the center of the disc member 3 is engaged with the projections 43 of the auxiliary ring 4 and the through holes 35 around the outer circumferential edge thereof are engaged with the pins 63. This synthetic sheet 34 is composed of a thermoplastic synthetic resin, and a polyethylene terephthalate resin is used in this embodiment.

Next, the reinforcing strand 33 wound around a reel 66 is stretched between the projections 43 of the auxiliary ring 4 and the pins 63 of the stretching table 62 making use of the movement and rotation of the stretching table 62. In this embodiment, the reinforcing strand 33 is composed of a fiber bundle made by bundling polyaramide fibers.

The procedure of the stretching is effected as follows.

First, an end of the reinforcing strand 33 is locked at one of the projections 43, then hooked by the pin 63 dislocated one and half pitches clockwise from the position confronting this projection 43 and returned to the auxiliary plate 4 side. The strand 33 returned to the auxiliary plate 4 side is wound around the projection 43 dislocated three pitches clockwise from the projection 43 at which the end thereof is locked and then locked at the projection 43 located next to the start point by being wound clockwise therearound. When this procedure is repeated sixteen times thereafter, the thirty two pieces of the reinforcing strands 33 are stretched between the pins 63 and the projections 43, as shown by a virtual line in FIG. 14.

After the reinforcing strand 33 is stretched in the radial directions, the reinforcing strand 33 extended from the final end thereof is repeatedly stretched from the pins 63 to the pins 63.

Figure 15:
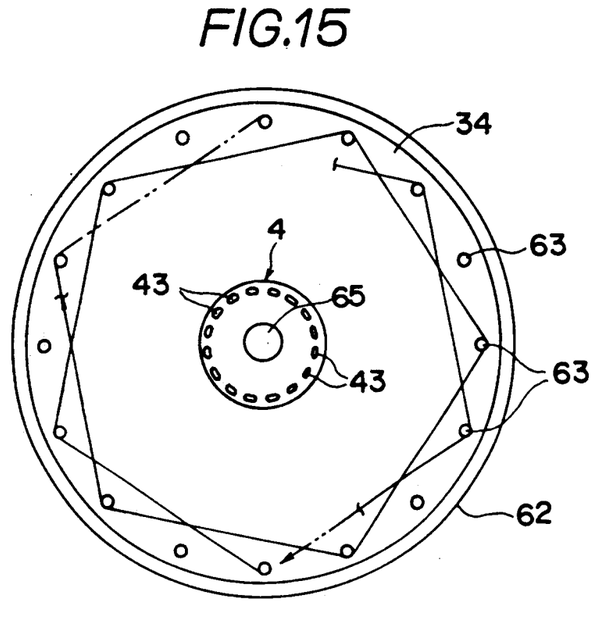
Figure 16:
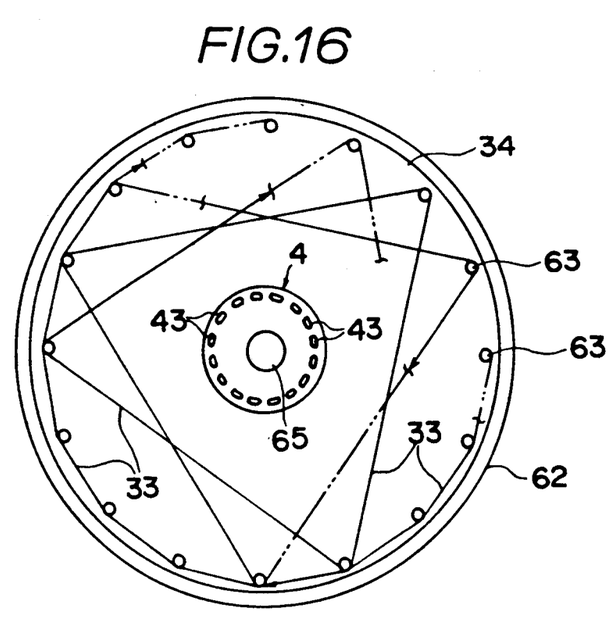

In this embodiment, the disc member 3 is arranged to stretch six arcs of the strands 33 from one of the nipples 8. To achieve this arrangement of the reinforcing strand 33, first, the reinforcing strand 33 starting clockwise from one of the pins 63 is locked at every third pin 63 and travels around the stretching table 62 three times, as shown in FIG. 15. Next, the reinforcing strand starting clockwise from one of the pins 63 is locked at every fifth pin 63 and travels around the stretching table 62 five times, as shown in FIG. 16. Thus, the reinforcing strand 33 returns to the initial pin 63. After that, the reinforcing strand 33 is wound in such a manner that it is locked at all of the pins 63, 63 ... to complete the stretching of the reinforcing strand 33, as shown in FIG. 16. Note that the reinforcing strand 33 is stretched to the disc member 3 with a predetermined tension W so that uniform tension is exerted on the overall disc member 3.

Figure 10:
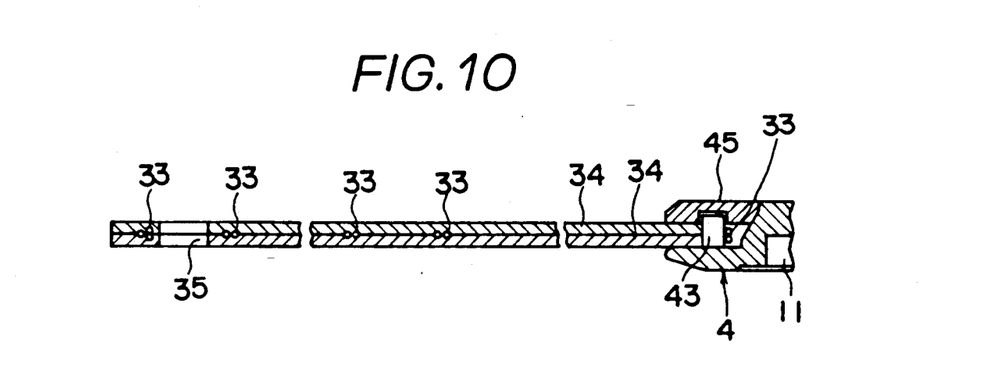
FIG. 10 is a cross sectional view of a disc member of the second embodiment.

When the reinforcing strand 33 has been stretched, the reinforcing strand 33 is covered by a synthetic resin sheet 34 similar to the above synthetic resin sheet 34. The reinforcing strand 33 is integrally formed with these synthetic resin sheets 34, 34 when the sheets are subject to a thermal or ultrasonic welding, as shown in FIG. 10. Finally, the pressing plate 45 is mounted to the auxiliary ring 4 by the screws to complete disc member 3.

Figure 17:
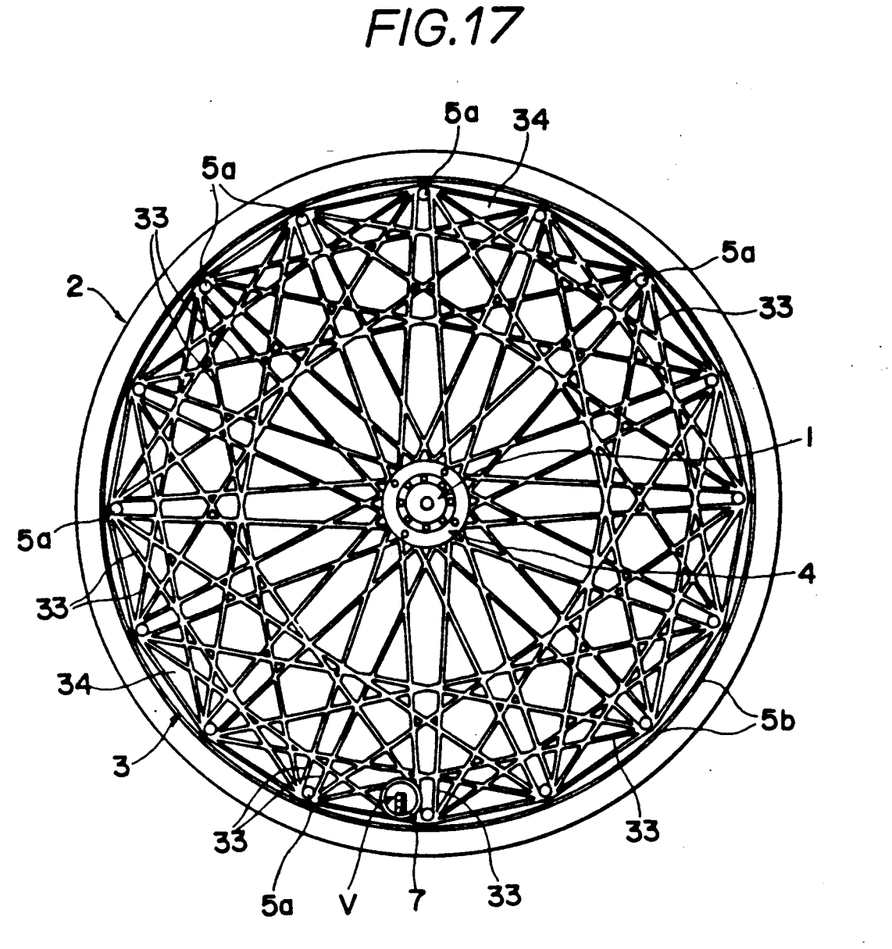
FIG. 17 is a side elevational view illustrative of a disc member provided with an opening with which an air pump is coupled.
Figure 18:
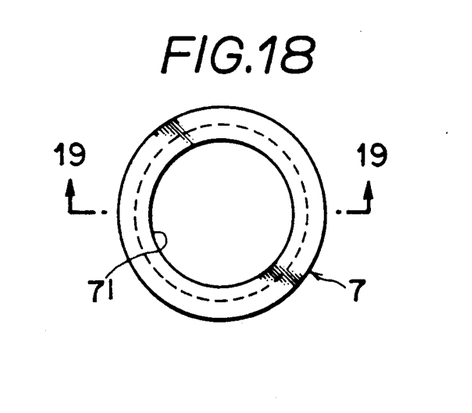
FIG. 18 is a side elevational view illustrative of a reinforcing ring.
Figure 19:
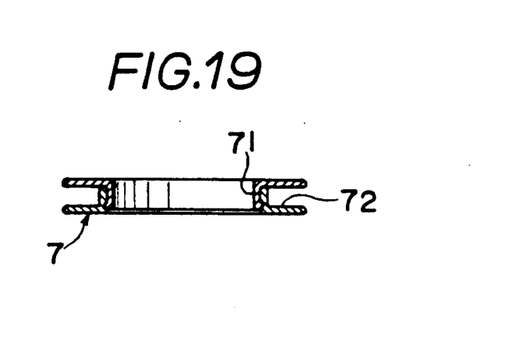
FIG. 19 is a cross sectional view taken along line 19—19 of FIG. 18.

Note that an opening 71 surrounded by a reinforcing ring 7 is provided with the disc member 3 assembled to any one side of the wheel at a position thereof corresponding to a tire valve V to facilitate the connection of an air pump to the tire valve V (see FIG. 17). The disc member 3 including the opening 71 can be fabricated like the disc member 3 without the opening 71 in such a manner that the reinforcing ring 7 (FIGS. 18 and 19) having a groove 72 defined around the outer circumference thereof is fixed at a corresponding position of the stretching table 62 and the reinforcing strand 33 passing through the opening 71 is bypassed along the groove 72 of the reinforcing ring 7.

The hub 1 is mounted on the center of a pair of the disc members 3 fabricated as described above by fixing the auxiliary plates 4 to the flanges 11 at the opposite sides of the hub 1 by the screws. Next, when the through holes 35 of the disc members 3 disposed at the opposite sides are alternately engaged with the locking members 8a of the nipples 8 disposed in the mounting holes of the rim 3 and the screw members 8b of the respective nipples 8, 8 . . . are threaded into the locking members 8a, the disc members 3 are stretched between the rim 2 and the hub 1, whereby the wheel having the opposite sides thereof covered by the disc members 3 is completed.

The balance of tension exerted on a pair of the disc members 3 of the wheel of this embodiment can also be adjusted by adjusting a threading amount of the screw members 8b, 8b . . . like the above first embodiment.

Further, in this embodiment, the tension is also exerted to the eight reinforcing strands 33 extending in radial and arc directions from each through hole 35 by engaging the locking members 8a with the through holes 35 to enable the disc member 3 to be stretched. Therefore, since a shock load exerted on the rim 2 is also absorbed by these respective reinforcing strands 33, 33 . . . , the resistance to shock of the wheel is more improved.

Figures 20, 21:
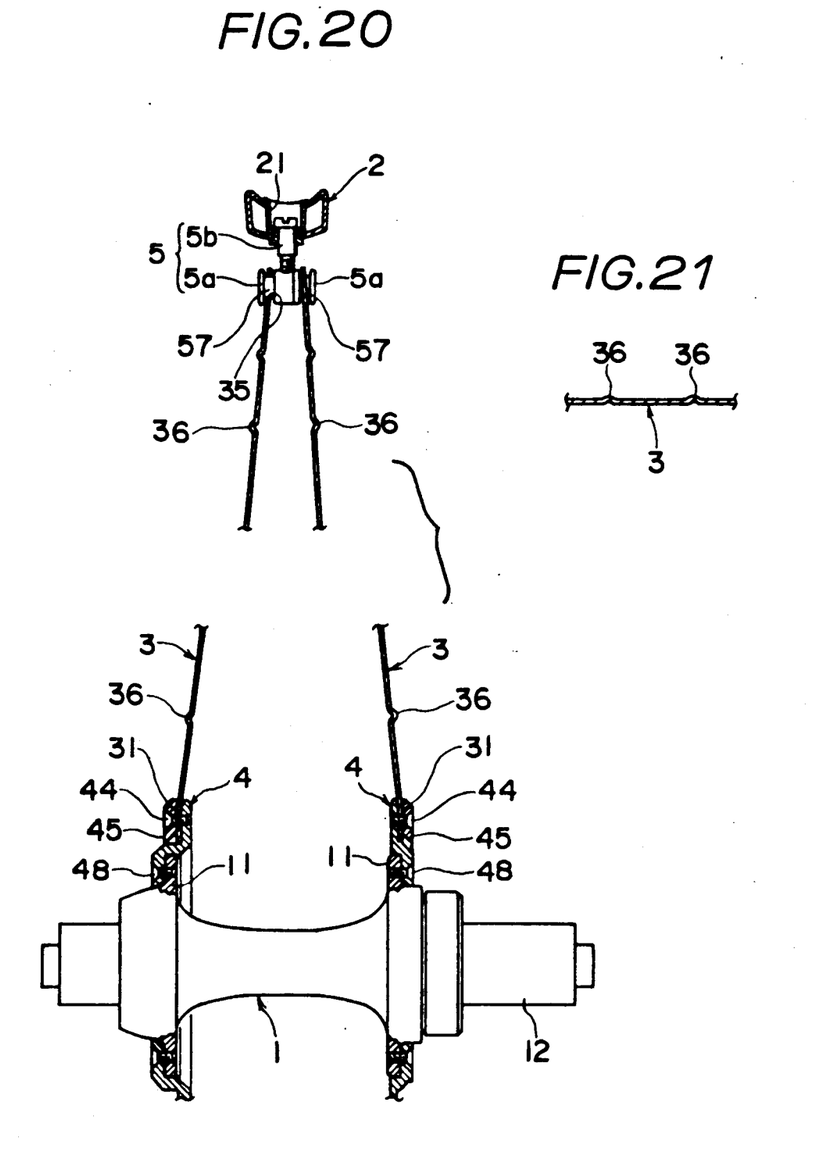
FIG. 20 is a cross sectional view illustrative of a modification of the first embodiment.
FIG. 21 is a partially enlarged cross sectional view of a disc member shown in FIG. 20.

In the second embodiment, the resistance to shock is improved by the fiber material accommodated in the synthetic resin sheet 34. When, however, the disc member 3 is arranged by using a thin metal plate as in the first embodiment, the disc member 3 having improved resistance to shock can be obtained like the second embodiment by providing a raised reinforcing portion 36 to define a substantially V-shaped cross section (FIGS. 20 and 21) in the same fashion as FIG. 6.

Further, the nipples 5 and 8 in the above embodiments may be composed of a locking member 5a or 8a provided with a male screw and a screw member 5b or 8b provided with a female screw. With this arrangement, a screw member same as a spoke nipple used in the conventional spoke wheel can be employed.

What is claimed is:

1. A wheel for light vehicles, comprising:
    a hub including a rotating shaft;
    a rim surrounding the hub at a predetermined distance;
    a pair of disc members with each disc member composed of at least one smooth surfaced, sheet member stretched between said hub and said rim for coupling the former with the latter; and
    each of said disc members has an opening defined at the center thereof to fit said hub, an inner circumferential edge detachably coupled with said hub and an outer circumferential edge detachably fixed to said rim by screw threading means and said disc member is stretched by a tensile force applied by said screw threading means and corresponding to the extent of threading of said screw threading means.

2. A wheel for light vehicles according to claim 1, wherein
    each of said disc members includes a plurality of reinforcing members disposed substantially tangentially relative to said hub and extending toward said outer circumferential edge.

3. A wheel for light vehicles according to claim 1,
    wherein each of said disc members includes a plurality of reinforcing members disposed substantially tangentially relative to said hub and extending toward said outer circumferential edge and a plurality of reinforcing members disposed to extend in directions of chords of an arc defined by said rim.

4. A wheel for light vehicles according to claim 2 or 3, wherein said disc members are composed of a sheet of synthetic resin material and include a reinforcing member composed of a fiber material linearly disposed relative to said disc member and enhancing the tensile strength of said disc member in the direction of said fiber material.

5. A disc member for a light vehicle wheel including a hub and a rim, comprising:
    a smooth surfaced, flat circular plate having an outer circumferential edge detachably coupled with the rim by a screw threading means;
    an opening at the center of said plate to fit the hub;
    an inner circumferential edge of said opening detachably coupled with said hub; and
    said flat circular plate is stretched between said hub and rim of said wheel by a tensile force applied by said screw threading means and corresponding to the extent of threading of said screw threading means.

6. A disc member for a light vehicle wheel according to claim 5, wherein said disc member is provided with a plurality of reinforcing members disposed substantially tangentially relative to said hub and extending toward said outer circumferential edge of said plate.

7. A disc member for a light vehicle wheel according to claim 5, wherein said disc member
    includes a plurality of reinforcing members disposed substantially tangentially relative to said hub and extending toward said outer circumferential edge of said plate and a plurality of reinforcing members disposed to extend in directions of chords of an arc defined by said rim.

8. A disc member for a light vehicle wheel according to claim 6 or 7, wherein said disc memer is composed of a sheet of synthetic resin material and includes a reinforcing member composed of a fiber material linearly disposed relative to said disc member and enhancing the tensile strength of said disc member in the direction of said fiber material.

* * * * *